United States Patent
Jalla

(10) Patent No.: US 11,222,387 B2
(45) Date of Patent: Jan. 11, 2022

(54) METHOD AND SYSTEM FOR PROCESSING AND GENERATING A BUILDING REPORT

(71) Applicant: Consulting Engineers, Corp., Reston, VA (US)

(72) Inventor: Maharaj Jalla, Great Falls, VA (US)

(73) Assignee: Consulting Engineers, Corp., Reston, VA (US)

( * ) Notice: Subject to any disclaimer, the term of this patent is extended or adjusted under 35 U.S.C. 154(b) by 0 days.

(21) Appl. No.: 16/695,328

(22) Filed: Nov. 26, 2019

(65) Prior Publication Data

US 2021/0110618 A1    Apr. 15, 2021

Related U.S. Application Data

(60) Provisional application No. 62/912,692, filed on Oct. 9, 2019.

(51) Int. Cl.
| | |
|---|---|
| *G06T 19/20* | (2011.01) |
| *G06Q 50/08* | (2012.01) |
| *G05B 19/418* | (2006.01) |
| *G06F 30/13* | (2020.01) |
| *G01B 21/28* | (2006.01) |
| *G01B 21/30* | (2006.01) |
| *G06T 17/10* | (2006.01) |
| *G01B 21/08* | (2006.01) |
| *G06T 15/10* | (2011.01) |
| *G06F 111/02* | (2020.01) |

(Continued)

(52) U.S. Cl.
CPC ............ *G06Q 50/08* (2013.01); *G01B 21/08* (2013.01); *G01B 21/28* (2013.01); *G01B 21/30* (2013.01); *G05B 19/41805* (2013.01); *G06F 30/13* (2020.01); *G06T 15/10* (2013.01); *G06T 17/10* (2013.01); *G06T 19/20* (2013.01); *G06F 2111/02* (2020.01); *G06F 2111/20* (2020.01); *G06F 2113/24* (2020.01); *G06T 2210/04* (2013.01)

(58) Field of Classification Search
CPC . G06T 19/20; G06T 2210/04; G06T 2200/24; G06T 2207/20092; G06T 7/0006; G06T 19/00; G06T 7/0002; G06T 17/20; G06T 2207/20081; G06T 5/002; G06T 7/194; G06T 7/0004; G06F 30/13; G06F 2111/20; G06F 30/00; G06F 2111/04; G06F 30/12; G06F 12/0646; G06F 2111/02; G06F 16/51; G06Q 50/08; G06Q 10/103
See application file for complete search history.

(56) References Cited

U.S. PATENT DOCUMENTS

2010/0138762 A1*  6/2010  Reghetti ................. G06T 19/20
                                                    715/765
2019/0205485 A1*  7/2019  Rejeb Sfar .............. G06F 30/13

* cited by examiner

*Primary Examiner* — Xilin Guo
(74) *Attorney, Agent, or Firm* — Andrew Morabito

(57) ABSTRACT

The present invention is a computer-implemented method comprising: receiving at least one architectural drawing; analyzing each of the at least one architectural drawing, wherein non-structural elements are removed from each of the at least one architectural drawing; generating structural drawings for each of the at least one architectural drawing; marking each element within the structural drawings; generating a 3D model based on the structural drawings; analyzing the 3D model, wherein the 3D model is tested for predetermined characteristics; and generating a report based on the analyzed results of the predetermined characteristics.

14 Claims, 8 Drawing Sheets

(51) Int. Cl.
*G06F 113/24* (2020.01)
*G06F 111/20* (2020.01)

| Second Floor Framing Joists | | | | |
|---|---|---|---|---|
| Name | 2G8J32 | 2G6J6 | 1G10J10 | 1G9J9 |
| Type | CFS | CFS | CFS | CFS |
| Designation | Webbed | Webbed | Webbed | Webbed |
| Size | 12 | 12 | 12 | 12 |
| Span | 20 | 20 | 20 | 20 |
| Spacing | 16 | 16 | 16 | 16 |
| Design | | | | |
| Max. BM, ft-lb | 40000 | 40000 | 40000 | 40000 |
| Max. SF, lb | 604.17 | 604.17 | 604.17 | 604.17 |
| Bending Stress (psi) | | | | |
| Actual | 1264.2 | 1264.2 | 1264.2 | 1264.2 |
| Allowable | 977.5 | 977.5 | 977.5 | 977.5 |
| Ratio | 1.29 | 1.29 | 1.29 | 1.29 |
| Shear Stress (psi) | | | | |
| Actual | 53.7 | 53.7 | 53.7 | 53.7 |
| Allowable | 150 | 150 | 150 | 150 |
| Ratio | 0.36 | 0.36 | 0.36 | 0.36 |
| Deflection (LL) | | | | |
| Actual (in.) | 0.83 | 0.83 | 0.83 | 0.83 |
| Allowable (in.) | 0.67 | 0.67 | 0.67 | 0.67 |
| Ratio | 1.24 | 1.24 | 1.24 | 1.24 |
| Deflection (Total) | | | | |
| Actual (in.) | 1.04 | 1.04 | 1.04 | 1.04 |
| Allowable (in.) | 1 | 1 | 1 | 1 |
| Optimum Size | 14 | 14 | 14 | 14 |

FIG. 7

| | Estimate Summary | | | |
|---|---|---|---|---|
| S. No. | Item | Quantity | Unit | Remarks |
| 1 | Cost of Frame | | | |
| 1.1 | CFS Framing (89 X 41X 0.75 THK Galvalume, Yield Strength – 550 Mpa) | 5,829 | Kg | Considering 89x41x.75 Stud |
| 2 | Fixing | | | |
| 2.1 | #10-16 x16 mm Wafer Screw | 9050 | Nos | For Wall Panels |
| 2.2 | #10-16 x16 mm Tek | 1004 | Nos | For Roof Trusses |
| 2.3 | #10-16 x16 mm Tek | 14600 | Nos | For Joist |
| 3 | False ceiling | | | |
| 3.1 | Gypsum board or 8 mm Cement Board | 186 | Sq.m | |
| 4 | External Wall cladding | | | |
| 4.1 | 9 mm Cement Board | 432 | Sq.m | |
| 5 | Wall Insulation: | | | |
| 5.1 | Interior Wall insulation | 38 | Cu.m | For Internal Wall |
| 5.2 | Exterior Wall insulation | 27 | Cu.m | For External Wall |
| 6 | Internal wall cladding and finishing: | | | |
| 6.1 | 8 mm Cement Board | 634 | Sq.m | |
| 7 | Flooring | | | |
| 7.1 | Tiles (if applicable) | 186 | Sq.m | Above concrete slab |
| 7.2 | Metal Sheet For Roof | 40.3 | Sq.m | |
| 8 | Excavation | | | |
| 8.1 | | 40 | Cu.m | Considering SBC= 100 Kpa |
| 9 | Concrete | | | |
| 9.1 | Slab on Grade of 100 mm thk and Cont. Wall Turndown Footing of 450 mm x 300mm | 34.8 | Cu.m | Considering SBC= 100 Kpa and Concrete Strength as 20 MPa |

FIG. 8

METHOD AND SYSTEM FOR PROCESSING AND GENERATING A BUILDING REPORT

CROSS-REFERENCE TO RELATED APPLICATIONS

This application is a continuation-in-part (and claims the benefit of priority under 35 USC 120) of U.S. provisional application No. 62/2912688 filed Oct. 9, 2019, U.S. provisional application No. 62/912692 filed Oct. 9, 2019. The disclosure of the prior applications is considered part of (and is incorporated by reference in) the disclosure of this application.

BACKGROUND

This disclosure relates generally to generating a design and detailing of a building, and more specifically to a method, computer program and computer system for automating the process of detailing and generating a report for the building.

Computer Aided Design software is well-known, and used by architects, engineers, designers, planners, construction firms, and owner operators and the like to create and use precision models and technical illustrations. The software is used to create design simulations that are two-dimensional (2-D) drawings, and three-dimensional (3-D) models and related tabular and business property data.

Three-dimensional (3D) assets are commonly designed, analyzed, and built, using a process in which design teams invest large amounts of time, money, and effort, creating insightful 3D digital models of those assets using design software. Design teams gain a tremendous amount of insight into projects while constructing and editing these 3D models. These 3D models are used commonly for analytical and visualization purposes, and increasingly, models are used to automate the production of conventional construction drawings.

Conventional construction drawings are 2D, flat abstractions of things. Conventional construction documentation drawings assist design professionals in explicitly defining limits of liability of the design professionals who draw them. Project designers mitigate liability a priori by selecting the locations within a project at which they intend to design, draw (automated by 3D models or not), and be held accountable.

These 2D drawings are typically created with a variety of features, callouts, and aspects which are beneficial for the professionals but may be problematic for software to decipher and determine which features of the drawings are what. This results in computer programs are not able to take the received images and properly process them or process them incorrectly.

Therefore, a design teams needs to manually go through the 2D drawings and either properly convert them into 3D models or generate the 3D models from desire to provide as much useful information from their design processes as possible. No one can distinguish between the locations in 3D models that are complete and the locations that are not complete. Models are frequently discarded because of that ambiguity. No one can tell which locations in the model are complete and which locations are not complete, nor can anyone tell who claims responsibility for any particular location in a model. It is this deficiency of 3D models that is addressed by this invention and solved.

SUMMARY

In a first embodiment, the present invention is a computer implemented method comprising: receiving, by a computing device, at least one architectural drawing; analyzing, by the computing device, each of the at least one architectural drawing, wherein non-structural elements are removed from each of the at least one architectural drawing; generating, by the computing device, structural drawings for each of the at least one architectural drawing; marking, by the computing device, each element within the structural drawings; generating, by the computing device, a 3D model based on the structural drawings; analyzing, by the computing device, the 3D model, wherein the 3D model is tested for predetermined characteristics; and generating, by the computing device, a report based on the analyzed results of the predetermined characteristics.

In a second embodiment, the present invention is a computer program product, the computer program product comprising a computer readable storage medium having program instructions embodied therewith, the program instructions executable by a computing device to cause the computing device to: program instructions to receive at least one architectural drawing; program instructions to analyze each of the at least one architectural drawing, wherein non-structural elements are removed from each of the at least one architectural drawing; program instructions to generate structural drawings for each of the at least one architectural drawing; program instructions to mark each element within the structural drawings; program instructions to generate a 3D model based on the structural drawings; program instructions to analyze the 3D model, wherein the 3D model is tested for predetermined characteristics; and program instructions to generate, a report based on the analyzed results of the predetermined characteristics.

In a third embodiment, the present invention is a system comprising: a CPU, a computer readable memory and a computer readable storage medium associated with a computing device; program instructions to receive at least one architectural drawing; program instructions to analyze each of the at least one architectural drawing, wherein non-structural elements are removed from each of the at least one architectural drawing; program instructions to generate structural drawings for each of the at least one architectural drawing; program instructions to mark each element within the structural drawings; program instructions to generate a 3D model based on the structural drawings; program instructions to analyze the 3D model, wherein the 3D model is tested for predetermined characteristics; and program instructions to generate, a report based on the analyzed results of the predetermined characteristics.

BRIEF DESCRIPTION OF THE DRAWINGS

Referring now to the drawings in which like reference numbers represent corresponding parts throughout:

FIG. 7 depicts a report of the analysis of the 3-Dimensional model, in accordance with one embodiment of the present invention.

FIG. 8 depicts a report of the Bill of Quantities of the 3-Dimensional model, in accordance with one embodiment of the present invention.

DETAILED DESCRIPTION

Figure 1:
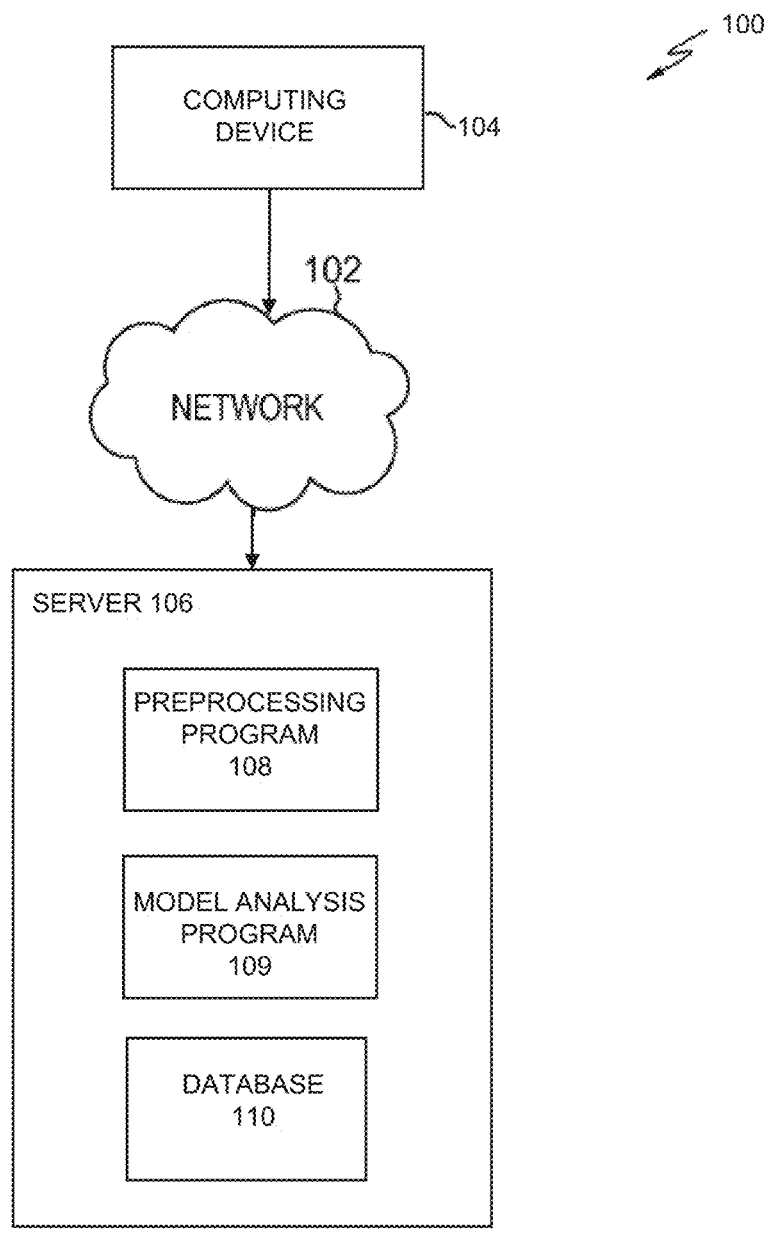
FIG. 1 depicts a block diagram depicting a computing environment, in accordance with one embodiment of the present invention.

The present invention generally relates to receiving architectural drawings, processing the drawings to generate a 3-dimensional model. Performing an analysis on the generated model and determining if the model has an issues or conflicts which would require corrections, so that a real-world version of the model can be built with minimal or no issues. The program is used to automate the process of building design and detailing. Through the process of "autoframing" the building is able to be analyzed by taking architecture drawings, have details feed into the program, and a complete building design and detailing be generated. This includes, but is not limited to, Structural Drawings, Erection Drawings, Bill of Quantities, Feasibility Report, Input Files for CNC machines, Design Reports, and Connection Designs. The process of autoframing is used in various industries from commercial to residential and with various materials.

In the method and system of Building Construction, the Engineering and Detailing of the Building has to be done as per the governing Building Design Codes, Local Design procedures and the Construction practices in the Project Locality. Each locality and governing design code may be different. This creates a situation where a builder or designer needs to adjust, modify, or change their building techniques based on these laws and regulations. If a building is designed and these laws and regulations are ignored or incorrect, the entire project and design work may be denied, and tremendous amounts of time and money is wasted. Through the use of the present invention, these laws and regulations are able to be incorporated into the program to make the proper adjustments or highlight the areas of conflict within the building, so that these issues can be addressed early and often.

Traditional method of performing Engineering Design and Detailing in separate software is time consuming and chances of error are more. The present Invention uses the unique feature of performing all the Engineering Design and Detailing, material optimization, Various Reports in one Software Save time for the project engineering and detailing. The unique feature saves the time of separate design and Detailing, material optimization, CNC files generation and also eliminate the changes of error due to duplication of Data from one software to another software.

The present invention may be a system, a method, and/or a computer program product. The computer program product may include a computer readable storage medium (or media) having computer readable program instructions thereon for causing a processor to carry out aspects of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects may generally be referred to herein as a "circuit," "module", or "system." Furthermore, aspects of the present invention may take the form of a computer program product embodied in one or more computer readable medium(s) having computer readable program code/instructions embodied thereon.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

FIG. 1 depicts a block diagram of a computing environment 100 in accordance with one embodiment of the present invention. FIG. 1 provides an illustration of one embodiment and does not imply any limitations regarding the environment in which different embodiments maybe implemented.

In the depicted embodiment, computing environment 100 includes network 102, computing device 104, and server 106. Computing environment 100 may include additional servers, computers, or other devices not shown.

Network 102 may be a local area network (LAN), a wide area network (WAN) such as the Internet, any combination thereof, or any combination of connections and protocols that can support communications between computing device 104 and server 106 in accordance with embodiments of the invention. Network 102 may include wired, wireless, or fiber optic connections.

Computing device 104 may be a management server, a web server, or any other electronic device or computing system capable of processing program instructions and receiving and sending data. In other embodiments, computing device 104 may be a laptop computer, tablet computer, netbook computer, personal computer (PC), a desktop computer, or any programmable electronic device capable of communicating with patient computing device 104 via network 102. In other embodiments, computing device 104 may be a server computing system utilizing multiple computers as a server system, such as in a cloud computing environment. In one embodiment, computing device 104 represents a computing system utilizing clustered computers and components to act as a single pool of seamless resources. Computing device 104 may include components, as depicted and described in further detail with respect to FIG. 1.

Server 106 may be a management server, a web server, or any other electronic device or computing system capable of processing program instructions and receiving and sending data. In other embodiments server 106 may be a laptop computer, tablet computer, netbook computer, personal computer (PC), a desktop computer, or any programmable electronic device capable of communicating via network 102. In one embodiment, server 106 may be a server computing system utilizing multiple computers as a server system, such as in a cloud computing environment. In one embodiment, server 106 represents a computing system utilizing clustered computers and components to act as a single pool of seamless resources. In the depicted embodiment preprocessing program 108 and model analysis program 109 and database 110 are located on server 106. Server 106 may include components, as depicted and described in further detail with respect to FIG. 1.

Preprocessing program 108 features the ability to receive various drawings, figures, or models and prepare them for the model analysis program 109 to process and analyses the building. The preprocessing program 108 is able to take the various drawings or models and remove elements which are not desired or necessary for the model analysis program 109. The preprocessing program 108 is able to then create drawings or models which the model analysis program 109 is able to read and complete the autoframing process. In the depicted embodiment, Preprocessing program 108 utilizes network 102 to access the computing device 104 and to communicate with database 110. In one embodiment, Preprocessing program 108 resides on computing device 104. In other embodiments, Preprocessing program 108 may be located on another server or computing device, provided Preprocessing program 108 has access to database 110. In some embodiments, the program 108 is a separate program or an Add-In to other preexisting technology. The program 108 works with a single interface for building modeling, design, construction, and machine generation files. The program 108 allows for the editing of the building materials to adjust the building design and construction.

Model analysis program 109 provides for the ability to complete the autoframing process. The model analysis program 109 takes the drawings or model generated by the preprocessing program 108 and generate the 3D model, scan the floors and model, identify different members and assemblies within the model, apply the loads to the members and assemblies, analyze the structure, and generate the reports based on the analysis. These reports may show various conflicts within the model, part lists, design optimizations, design improvements, input files for manufacturing, feasibility reports, and the like. In the depicted embodiment, the model analysis program 109 utilizes network 102 to access the computing device 104 and to communicate with database 110. In one embodiment, the model analysis program 109 resides on computing device 104. In other embodiments, the model analysis program 109 may be located on another server or computing device, provided the model analysis program 109 has access to database 110. In some embodiments, the model analysis program 109 is a separate program or an Add-In to other preexisting technology. The model analysis program 109 works with a single interface for building modeling, design, construction, and machine generation files. The program 109 allows for the editing of the building materials to adjust the building design and construction.

Database 110 may be a repository that may be written to and/or read by Preprocessing program 108 and model analysis program 109. Information gathered from computing device 104 and the 1-dimensional, 2-dimensional, and 3-dimensional drawings and models, the laws and regulations, and the reports. In one embodiment, database 110 is a database management system (DBMS) used to allow the definition, creation, querying, update, and administration of a database(s). In the depicted embodiment, database 110 resides on computing device 104. In other embodiments, database 110 resides on another server, or another computing device, provided that database 110 is accessible to Preprocessing program 108 and model analysis program 109.

Figure 2:
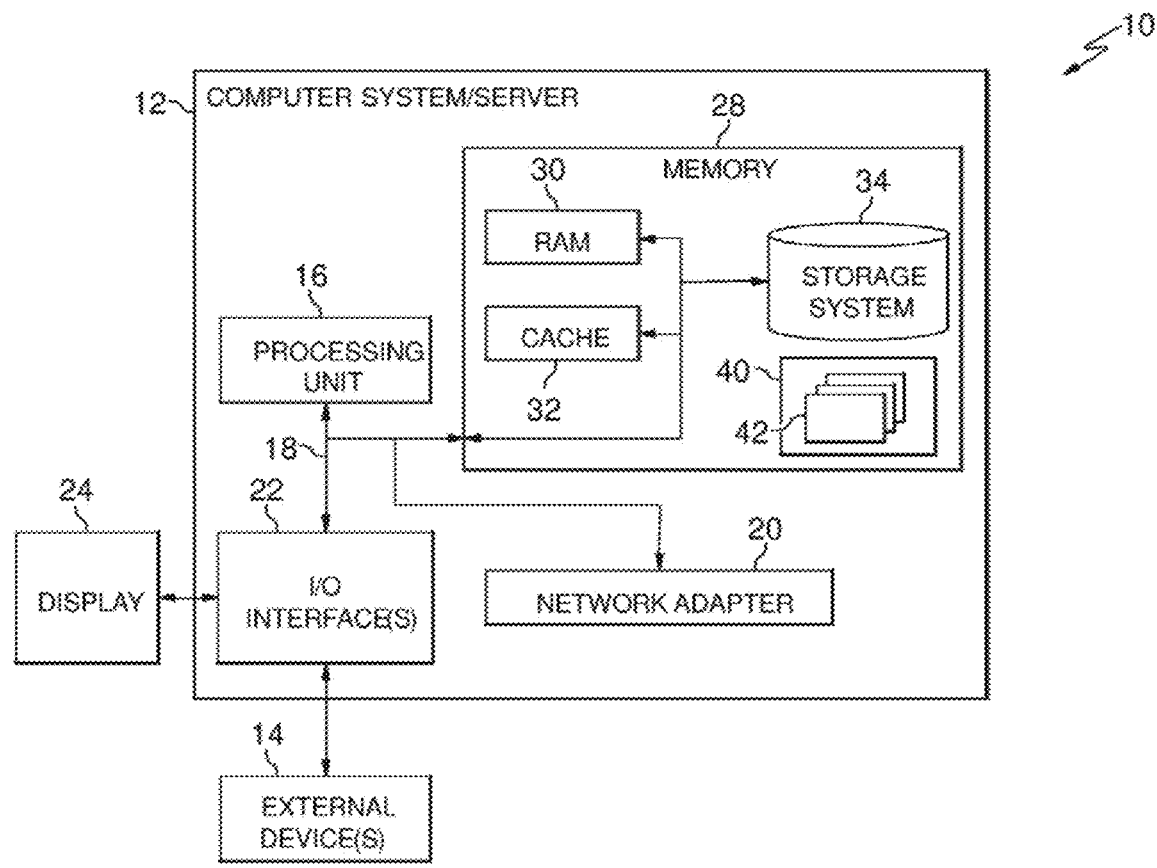
FIG. 2 depicts a block diagram depicting the internal and external components of the server and computing device of FIG. 1, in accordance with one embodiment of the present.

FIG. 2, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purposes or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

FIG. 2, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to microcode, device drivers, redundant processing units, external disk drive arrays, RAID systems, tape drives, and data archival storage systems, etc.

Figure 3:
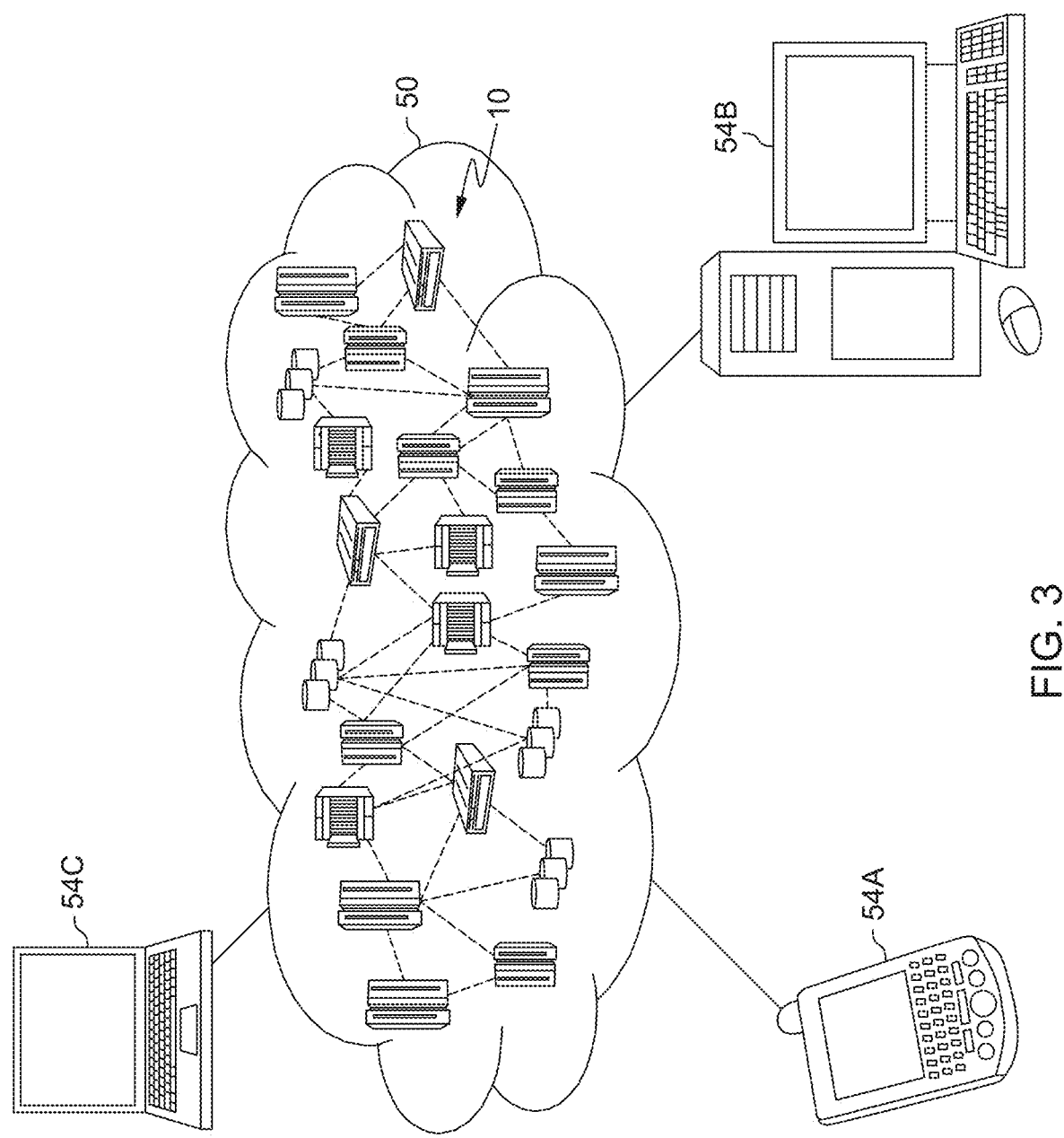
FIG. 3 depicts a cloud computing environment, in accordance with one embodiment of the present invention.

FIG. 3, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or additional computer systems may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-C shown in FIG. 2 are intended to be illustrative only and that computing nodes 10 and cloud computing environment 50 can communicate with any type of computerized device over any type of network and/or network addressable connection (e.g., using a web browser).

Referring back to FIG. 2, the Program/utility 40 may include one or more program modules 42 that generally carry out the functions and/or methodologies of embodiments of the invention as described herein.

Figure 4:
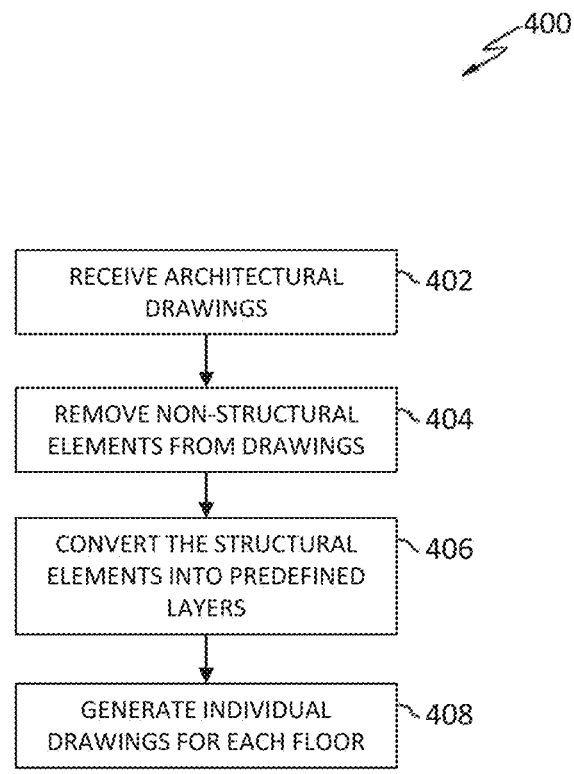
FIG. 4 depicts a flowchart of the operational steps of a method for preprocessing a drawing within the computing environment of FIG. 1, in accordance with one embodiment of the present invention.

FIG. 4 depicts flowchart 400 depicting a method according to the present invention. The method(s) and associated process(es) are now discussed, over the course of the following paragraphs, in accordance with one embodiment of the present invention.

The program(s) described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The preprocessing program 108 prepares the floor plans and models for the model analysis program 109. For the model analysis program 109 to properly analyze and generate the reports and results for the model, the drawings or model need to be cleaned and prepared.

In step 402, the preprocessing program 108, receives at least one architectural drawing for the building model of the building. These drawings may come in various forms, formats, file types, or the like based on the source from which the drawing is being received. In some embodiments, the architectural drawing is a 1-dimensional, 2-dimensional, or 3-dimensional drawing or model of a floor of a building, or the entire building. This may include everything from just the framing of the building to a fully furnished and completed building. An example of an architectural drawing which could be received is shown in FIG. 600A. This shows a partially finished drawing with various features and drawing lines. The drawing lines may be dimensions or other notes or comments which are included in the drawing but not an element of the building.

In step 404, the preprocessing program 108 removes non-structural elements from the drawing. Once the drawings and received, the preprocessing program 108 analyzes the drawings and determines which, if any, elements of the drawings are not structural or related to the relevant aspect of the building which the preprocessing program 108 is designed to identify and preserve. As shown in FIG. 600B, the lines which are used in the drafting software to identify parallel and perpendicular elements are removed. As well as the written words which are used to identify various rooms or elements within the drawings. Additionally, the lines which are associated with the staircases are also removed. The preprocessing program 108 can be designed to remove specific types of lines from the drawings based on either predetermined requests or manual requests. For example, if the requested drawings are only to include structural members, all the other lines and elements are removed from the drawings. If the request includes sub-systems, such as, but not limited to, HVAC, plumbing, electrical, or mechanical systems, these systems may remain in the figures after the removal step. In some embodiments, these non-structural elements are removed into separate layers.

In step 406, the preprocessing program 108 converts the structural elements into predefined layers. The program 108 is able to separate the drawings for each and every floor of the building. Once the undesired or unnecessary lines have been removed from the drawings, the preprocessing program 108 converts the remaining lines into structural layers for the model analysis program 110, and in a format which the model analysis program 110 can read and decipher. Based on the language, format type, or the like of the model analysis program 109 or a third-party program which is integrated into this system, the preprocessing program 108 is able to format the drawing generated in step 404 to be compatible with the model analysis program 109. This may require modifying, converting, adjusting, changing, or amending the elements of the drawings to coincide with the model analysis program 109. For example, the structural elements may be, but not limited to, bearing walls, foundation walls, doors, windows, ridges, hips, valleys, and other aspects of the building. In some embodiments, the drawing may have a multiple floor imprinted over one another, the preprocessing program 108 is able to determine the individual floor elements, and generate a plurality of drawings, where each drawing identified the elements of each floor.

In step 408, the preprocessing program 108 generates the individual drawing for each floor of the building. Through the generation of the drawing of each floor of the building, the preprocessing program 108 provides a drawing or set of drawings which the model analysis program 110 is able to upload, read, or convert without any issues or problems. This is vital to assisting the model analysis program 109 in being able to properly analyze the drawings and generate the model and reports for the building.

Figure 5:
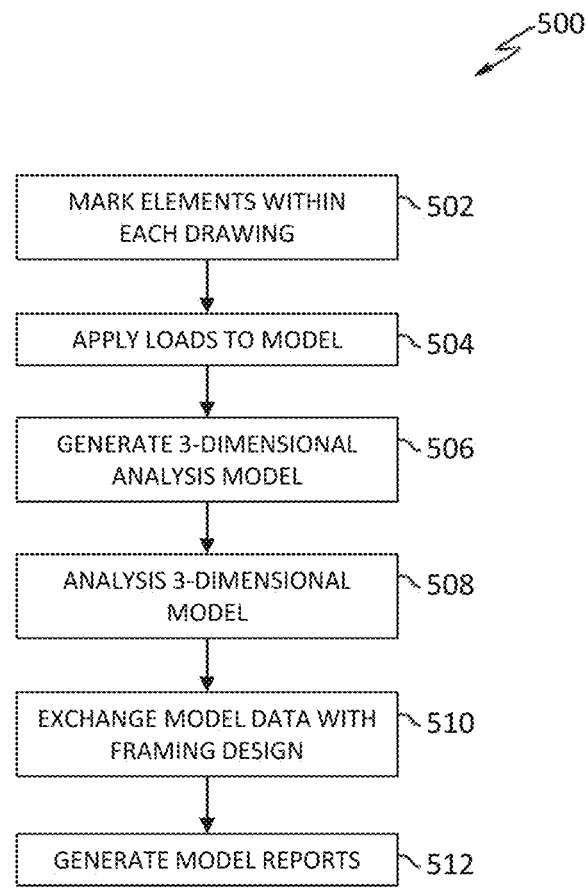
FIG. 5 depicts a flowchart of the operational steps of a method for processing and analyzing a 3-Dimensional model within the computing environment of FIG. 1, in accordance with another embodiment of the present invention.
Figure 6A:
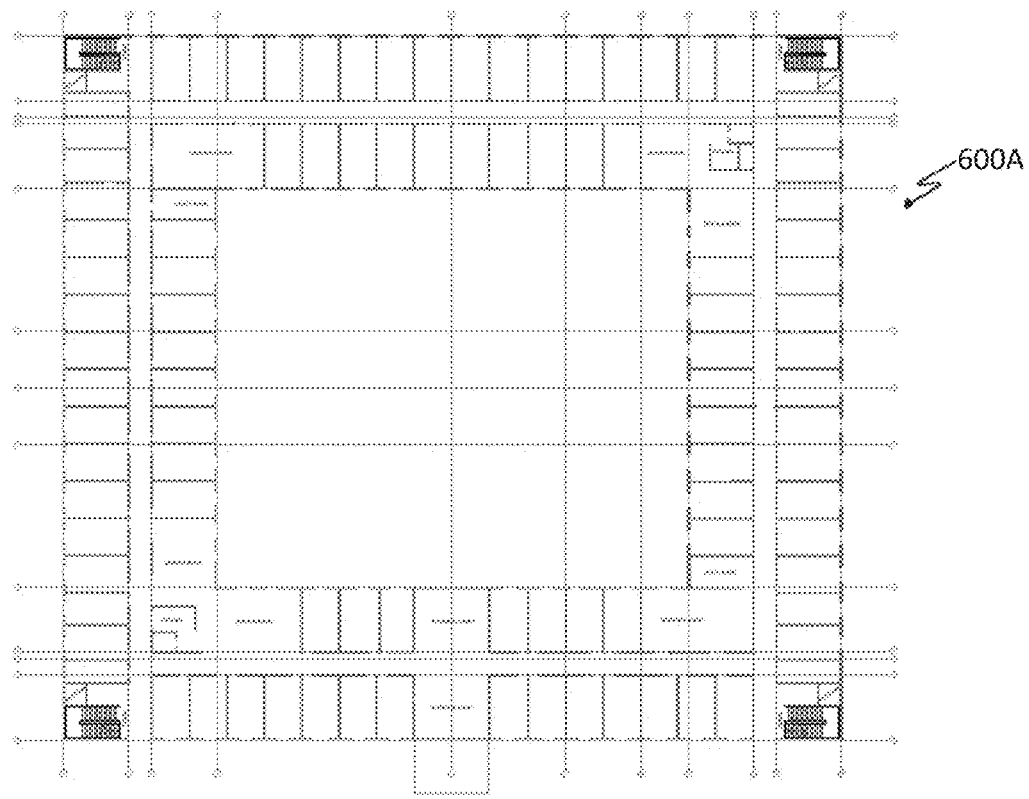
FIGS. 6A-B depicts exemplary images of a building floor pre and post the preprocessing, in accordance with one embodiment of the present invention.
Figure 6B:
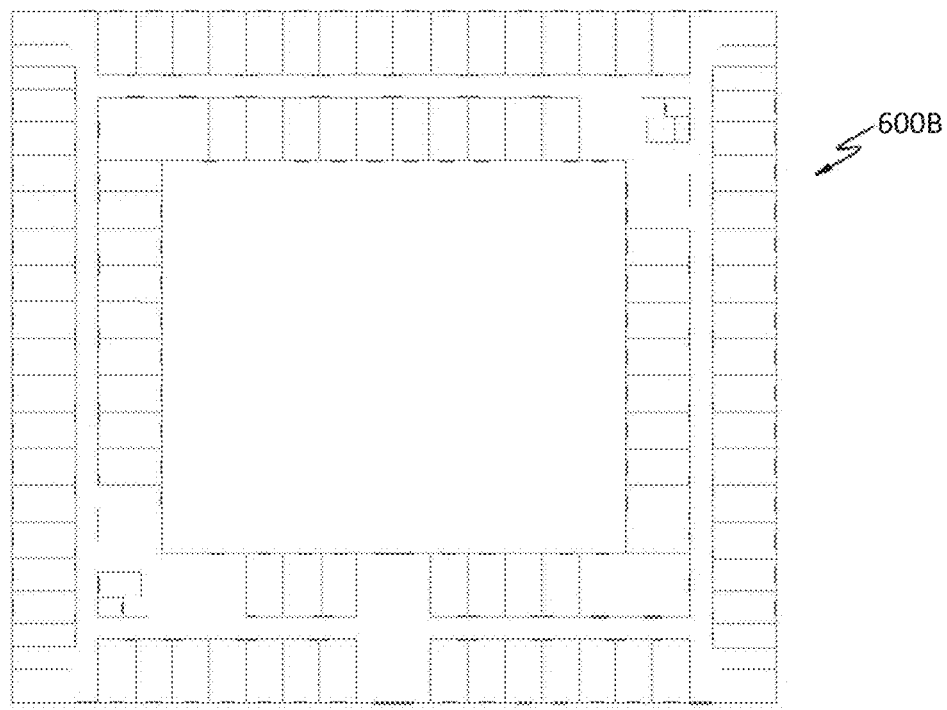

FIG. 5 depicts flowchart 500 depicting a method according to the present invention. The method(s) and associated process(es) are now discussed, over the course of the following paragraphs, in accordance with one embodiment of the present invention.

The program(s) described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The model analysis program 109 is able to generate a model of the building from the generated drawings, analyze the model, and either determine conflicts or issues with the model or generate a variety of reports based related to the model.

In step 502, the model analysis program 109 receives the individual drawings for each floor of the building and scans the drawings so that the model analysis program 109 is able to mark different elements within each drawing. For example, columns, walls, joists, beams, and the like which make up each floor. These elements form the structures of the building which are required to construct the building. The model analysis program 109 marks substantially all of the elements of the drawings to generate a completed model or drawing of the floor. In a preferred embodiment, all of the elements of the drawing are marked, however based on a manual or automated request. Specific elements may be left unmarked.

The process, in one embodiment, receives the drawings, the user inputs the default properties for each element type, the drawings (e.g. floors and roof) are scanned, the trusses are identified based on the type of truss (e.g. scissors, pitched, sawtooth, flat, or other), the option of single or multiple truss classes is identified, the trusses are marked. Then the wall attributes are selected. The window attributes are selected, the door attributes are selected. The joists are marked, and the program identifies this in the main file.

With the design outputs, the various elements can have their properties adjusted such as depth, material thickness and strength, spacing, span, and the like.

In step 504, the mode analysis program 109 applies a load to the structures. Various loads may be applied to the structure based on the desired "situation" the load is supposed to replicate. The load may be applied to specific members, connection or intersection of members, within assemblies, or the building structure/frame as a whole. The load is applied to simulate the real-world load which would be applied to each member, assembly, and over all structure of the building. Based on the jurisdiction and local building code conditions, the load applied may be varied to meet these requirements. The load may also be a live load which is the load produced by the use and occupancy of the building or other structure that does not include construction of environmental loads such as Rain, snow, earthquake, wind, and dead load. The dead load which is the weight of all materials of construction incorporated into the building including, but not limited to, walls, floors, roofs, ceilings, stairways, built-in partitions, finishes, cladding, and other similarly incorporated architectural and structural items, and fixed service equipment including the weight of cranes. In some embodiments, the building design is checked to safely resist the Snow load which is the load induced due to accumulation of the snow over the surface of the building. In additional embodiments, the building design is checked to safely resist the wind load and earthquake load also. wind load and earthquake load are applied in horizontal direction. Additionally, a combination of loads can be applied to the structure/frame based on the above listed loads.

In step 506, the model analysis program 109 generates a 3-Dimensional model from the drawings. After the loads are applied to the drawings, a 3D file is generated of the building. Within the 3D model, the joists, beams, walls, shear walls, trusses, columns, and the like design outputs are generated. Each element of the 3-D model has its own properties which are either assigned based on how the element was marked or can be assigned specifically to each element.

Joist design modules are available within the program including cantilevered joist design, multiple span joist designs, joist design with opening through the joist can be incorporated. Hot rolled steel design elements can be incorporated including hot rolled beams being analyzed for the gravity loading and frame design. Foundation design elements such as raft design, strip footing below load bearing walls and isolated footing below columns can be factored into the design.

In step 508, the model analysis program 109 analyzes the 3D model. The analysis of the 3D model is analyzed based on either automated or manual requests. These analyses may be built into the pre-exiting technology or program which the model analysis program 109 is integrated with or may run independently. The 3D model can be analyzed for a variety of features. For example, the 3D model may be analyzed for conflicts with the assemblies, members which fail under certain loads, members which are outside the predetermined safety factor rating, to determine if the 3D model meets all laws and regulations, determine which members are overdesigned based on the safety factors, feasibility analysis, and a multitude of other aspects of the building which are useful and/or required to properly and safely construct the building.

In step 510, the model analysis program 109 compare the model data with framing design. The model data collected from step 508 is compared to framing designs to check the capacity of the model components like the walls, roof, floors, beams, columns, etc. and compare the model data capacity with real life loads, forces, stresses. The model data is then compared to the valued calculated from the framing design loads, forces, and stresses. This comparison provides valuable information to confirm that the theoretical calculations would coincide with real world requirements. The framing design values and calculations are collected from database or a third party.

In step 512, the model analysis program 109 generates the model reports. The reports may be related to a plurality of aspects of the building. For example, the reports may be a design result, highlighting issues or problems with the overall design. A sick list or list identifying members which are conflicting with other members, members which are under designed, or the like. This may also be related to assemblies within the building. Optimization design reports to assist in modifying the design in areas where the building is over or under designed. Bill of materials can be generated. The reports may also include images or models of specific aspects of the building in 2D section and elevations from the 3D model. The model analysis program 109 is able to generate output files which would be used to manufacture the individual members for CNC machines or Cold Forming Steel machines. The model analysis program 109 may generated a feasibility report, and analysis and design report based on the user's requests. Additional reports may be generated based on the third-party software which is used in connection with the invention and also which machines are to be used to manufacture or generate the members of the building, once the final design of the members is determined.

In some embodiments, the analyzed 3D model provides a sick list of the failed members or elements based on the overall design, or elements which are outside the predetermined safety factor. With this suggested member or element optimizer is provided giving updated element properties to overcome the failures. The structure is analyzed, and various reports are generated. For example, structure defects, weaknesses, and issues are highlighted in the Sick List. The reports may be, but not limited to, a Design Result, Sick List, Optimized Design, BOQ, 2D views, 3D views, input files for a machine to product the material for the structure, feasibility repots, and analysis and design reports. FIG. 7 depicts an image of a design report where the applied loads to the specific members are highlighted and circled indicating which members failed, how they failed (e.g. what force caused the failure), and by what calculated value they failed by. This provides clear data to assist the user in updating, modifying, or adjusting these members to correct this issue, and produce specific values based on the design requirements. In some embodiments, the model analysis program 109 automatically updates, modifies, or adjusted the failed members to meet the desired or required calculated values to put these members in a passing state. In some additional embodiments, the reports which can be generated can contain various types of data based on the desired results. For example, feasibility of project, consumption per sq.ft. of steel, BOQ of total project. FIG. 8 depicts an example of a BOQ to identify an estimated summary of the building project, the quantity of parts, the fittings required, and other information which is vital to determine the overall cost and quantity of parts for the project. The program 109 is able to generate this either based on industry standard information or manual entry of information by the user related to either each member, each assembly, or each type of member. Various structural drawings, gravity design documents, lateral design documents, and machine files (for CNC machining) can be generated as well. In yet an additional embodiment, the report is a Bill of Materials including, but not limited to, connectors, HRS, concrete, and reinforcing steel can be included in the bill of materials.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

The foregoing descriptions of various embodiments have been presented only for purposes of illustration and description. They are not intended to be exhaustive or to limit the present invention to the forms disclosed. Accordingly, many modifications and variations of the present invention are possible in light of the above teachings will be apparent to practitioners skilled in the art. Additionally, the above disclosure is not intended to limit the present invention. In the specification and claims the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g. attached, adhered, joined) are to be construed broadly and may include intermediate members between a connection of elements and relative movement between elements. As such, joinder references do not necessarily infer that two elements are directly connected and in fixed relation to each other. Moreover, network connection references are to be construed broadly and may include intermediate members or devices between network connections of elements. As such, network connection references do not necessarily infer that two elements are in direct communication with each other. In some instances, in methodologies directly or indirectly set forth herein, various steps and operations are described in one possible order of operation, but those skilled in the art will recognize that steps and operations may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to the embodiments outlined above, various alternatives, modifications, variations, improvements and/or substantial equivalents, whether known or that are or may be presently foreseen, may become apparent to those having at least ordinary skill in the art. Listing the steps of a method in a certain order does not constitute any limitation on the order of the steps of the method. Accordingly, the embodiments of the invention set forth above are intended to be illustrative, not limiting. Persons skilled in the art will recognize that changes may be made in form and detail without departing from the spirit and scope of the invention. Therefore, the invention is intended to embrace all known or earlier developed alternatives, modifications, variations, improvements and/or substantial equivalents.

What is claimed is:

1. A computer implemented method comprising:
   receiving, by a computing device, at least one architectural drawing;
   analyzing, by the computing device, each of the at least one architectural drawing, to identify non-structural and structural elements of the at least one architectural drawings;
   marking, by the computing device, each line within the at least one architectural drawings, wherein the lines are marked based on their relationship to structural and non-structural elements;
   removing, by the computing device, the lines associated with the non structural elements from the at least one architectural drawing, wherein the structural element lines remain;
   generating, by the computing device, structural drawings for each of the at least one architectural drawing;
   performing, by the computing device a load test to the structural drawing;
   generating, by the computing device, a 3D model from the structural drawings wherein each structural element is created and has a set of properties applied based on the load test performed;
   comparing, by the computing device, data collected from the load test on the structural elements with framing data, wherein the 3D model structural elements are compared for load capacity
   performing, by the computing device, conflict tests of members of the 3D model; and
   generating, by the computing device, a report based on the analyzed results of the predetermined characteristics.

2. The computer implemented method of claim 1, further comprising, converting, by the computing device, the structural elements into predefined layers.

3. The computer implemented method of claim 1, further comprising, receiving, by the computing device, properties for each type of element which is marked in the structural drawings.

4. The computer implemented method of claim 1, further comprising, exchanging, by the computing device, 3D model data with framing design data.

5. The computer implement method of claim 1, wherein each non-structure and structural element has a predetermined set of data associated with each element type.

6. The computer implemented method of claim 1, wherein the applied load to the 3D model determines the integrity of the elements of the 3D model, further comprising, identifying, by the computing device, specific elements within the 3D model that fail to meet a predetermined threshold.

7. The computer- implemented method of claim 1, wherein the applied load to the 3D model determines if elements within the 3D model have conflicts with other elements.

8. The computer- implemented method of claim 1, further comprising, incorporating, by the computing device, subsystems into the 3D model.

9. The computer- implemented method of claim 8, further comprising, analyzing, by the computing device, to determine if the structural components and the sub-systems conflict.

10. A computer program product for processing and generating a building report comprising,
   a computer readable storage medium having program instructions embodied therewith, the program instructions executable by a computing device to cause the computing device to:
   program instructions to analyze architectural drawings, wherein structural elements are identified from non-structural elements and the non-structural elements are removed from the architectural drawings;

program instructions to identify an element type for each of the structural elements;
program instructions to convert the structural elements into predefined layers, wherein the predefined layers are related to the floors of a building;
program instructions to generate at least one structural drawings of each floor of the building;
program instructions to identify each of the structural elements within each of the at least on structural drawings, wherein the structural elements characteristics are identified, based on the set of data associated with the structural element types;
program instructions to generate a 3D model based on the at least one structural drawings;
program instructions to perform load tests on the 3D model, to identify failed structural elements within the 3D model and to identify conflicts between the structural elements; and
program instructions to compare the results of the load tests with model data to determine design capacities for each of the structural elements.

11. The computer program product of claim 10, further comprising, program instructions to receive the properties for each type of element which is marked in the structural drawings.

12. The computer program product of claim 10, further comprising, exchanging, by the computing device, 3D model data with framing design data.

13. The computer program product of claim 10, wherein the applied load to the 3D model determines the integrity of the elements of the 3D model, further comprising, program instructions to identify specific elements within the 3D model that fail to meet a predetermined threshold.

14. A system comprising:
a CPU, a computer readable memory and a computer readable storage medium associated with a computing device;
program instructions to analyze each of the architectural drawings to distinguish between structural elements and non-structural elements, wherein each element type has a set of data associated with the element type;
program instructions to mark architectural drawings, wherein lines of the architectural drawings are marked based on their association with structural and non-structural elements;
program instructions to remove the non-structural lines;
program instructions to generate a set of layers;
program instructions to perform load tests to the set of layers;
program instructions to generate a 3D model from the set of layers, wherein the structural elements are constructed, and properties are applied to each of the structural elements;
program instructions to identify the structural elements which are involved in a element-to-element conflict or failed the load test; and
program instructions to compare the load test date to a framing design model.

* * * * *